(12) United States Patent
Zhong (10) Patent No.: US 9,610,966 B2
(45) Date of Patent: Apr. 4, 2017

(54) INFANT CARRIER AND STROLLER APPARATUS INCLUDING THE SAME

(71) Applicant: Wonderland Nurserygoods Company Limited, Kwai Chung, N.T. (HK)

(72) Inventor: Zhi-ren Zhong, Kwai Chung (CN)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/879,832

(22) Filed: Oct. 9, 2015

(65) Prior Publication Data

US 2016/0101802 A1 Apr. 14, 2016

(30) Foreign Application Priority Data

Oct. 10, 2014 (CN) .......................... 2014 1 0531677

(51) Int. Cl.
*B62B 7/14* (2006.01)
*B62B 7/12* (2006.01)
(Continued)

(52) U.S. Cl.
CPC ................ *B62B 7/142* (2013.01); *A47D 9/00* (2013.01); *A47D 11/005* (2013.01); *B62B 7/123* (2013.01)

(58) Field of Classification Search
CPC .. B62B 7/12; B62B 7/123; B62B 7/14; B62B 7/142; B62B 7/147; B62B 9/104; A47D 9/00; A47D 11/005
See application file for complete search history.

(56) References Cited

U.S. PATENT DOCUMENTS

| 4,391,453 | A | * | 7/1983 | Glaser | ....................... B62B 7/06 280/47.4 |
| 5,553,885 | A | * | 9/1996 | Chang | ....................... B62B 7/08 280/642 |

(Continued)

FOREIGN PATENT DOCUMENTS

| CN | 204368233 U | 6/2015 |
| DE | 202012011228 U1 | 1/2013 |

(Continued)

OTHER PUBLICATIONS

Search Report issued on Feb. 24, 2016 in co-pending UK Patent Application No. 1517738.9.

*Primary Examiner* — Frank Vanaman
(74) *Attorney, Agent, or Firm* — David I. Roche; Baker & McKenzie LLP (57) ABSTRACT

An infant carrier includes a surrounding frame, a seat portion pivotally connected with the surrounding frame, a headrest portion pivotally connected with the surrounding frame, a backrest portion respectively connected pivotally with the seat portion and the headrest portion, and a latching mechanism assembled with the backrest portion and operable to selectively engage with either of the seat portion and the headrest portion, the latching mechanism being configured to lock the infant carrier in either of a bassinet configuration and a seat configuration. The seat portion and the backrest portion are substantially coplanar and the headrest portion extends at an angle from the backrest portion to the surrounding frame when the infant carrier is in the bassinet configuration, and the headrest portion and the backrest portion are substantially coplanar and the backrest portion extends at an angle from the seat portion when the infant carrier is in the seat configuration.

27 Claims, 11 Drawing Sheets

(51) Int. Cl.
*A47D 11/00* (2006.01)
*A47D 9/00* (2006.01)

(56) References Cited

U.S. PATENT DOCUMENTS

| | | | | |
|---|---|---|---|---|
| 5,752,738 | A * | 5/1998 | Onishi | B62B 7/08 280/642 |
| 6,032,975 | A * | 3/2000 | Hanson | A61G 5/00 280/250.1 |
| 2010/0244527 | A1* | 9/2010 | Chen | B62B 7/123 297/354.12 |
| 2011/0049955 | A1* | 3/2011 | Cheng | B62B 9/104 297/354.12 |
| 2014/0183843 | A1 | 7/2014 | Iftinca et al. | |

FOREIGN PATENT DOCUMENTS

| | | |
|---|---|---|
| EP | 0347361 A2 | 12/1989 |
| ES | 1031361 Y | 1/1996 |
| WO | 2006034615 A1 | 4/2006 |

* cited by examiner

INFANT CARRIER AND STROLLER APPARATUS INCLUDING THE SAME

CROSS-REFERENCE TO RELATED APPLICATION(S)

This application claims priority to China Patent Application No. 201410531677.8 filed on Oct. 10, 2014, the disclosure of which is incorporated herein by reference.

BACKGROUND

1. Field of the Invention

The present invention relates to an infant carrier that is convertible between a bassinet configuration and a seat configuration and can be detachably installed on a stroller frame.

2. Description of the Related Art

Infant strollers can provide a convenient way to transport babies and children. For a more flexible use, the infant stroller may accommodate multiple utility features, such as a removable seat and a removable bassinet. The removable seat and bassinet are conventionally provided as separate components that can be individually installed on and removed from the stroller frame according to the caregiver's needs. As a result, parents may need to purchase and store the seat and bassinet separately, which results in an increase in expenses and requires more space for storing the seat and bassinet.

Therefore, there is a need for an improved infant carrier that can be more flexible in use and address at least the foregoing issues.

SUMMARY

The present application describes an infant carrier that is convertible between a bassinet configuration and a seat configuration, and can be installed on a stroller frame or removed from the stroller frame for independent use.

In one embodiment, the infant carrier includes a surrounding frame, a seat portion pivotally connected with the surrounding frame, a headrest portion pivotally connected with the surrounding frame, a backrest portion respectively connected pivotally with the seat portion and the headrest portion, and a latching mechanism assembled with the backrest portion and operable to selectively engage with either of the seat portion and the headrest portion, the latching mechanism being configured to lock the infant carrier in either of a bassinet configuration and a seat configuration. The seat portion and the backrest portion are substantially coplanar and the headrest portion extends at an angle from the backrest portion to the surrounding frame when the infant carrier is in the bassinet configuration, and the headrest portion and the backrest portion are substantially coplanar and the backrest portion extends at an angle from the seat portion when the infant carrier is in the seat configuration.

In another embodiment, the infant carrier includes a surrounding frame, a seat portion pivotally connected with the surrounding frame, a headrest portion pivotally connected with the surrounding frame, a backrest portion having a first and a second end portion respectively connected pivotally with the seat portion and the headrest portion, and a latch assembled with the backrest portion, the latch being slidable between a first position where the latch is positioned adjacent to the first end portion and engages with the seat portion, and a second position where the latch is positioned adjacent to the second end portion and engages with the headrest portion, the latch being configured to lock the infant carrier in either of a bassinet configuration and a seat configuration. The seat portion and the backrest portion are arranged so as to receive a child in a generally horizontal position in the bassinet configuration, and the seat portion and the backrest portion are arranged so as to receive a child in a sitting position in the seat configuration.

DETAILED DESCRIPTION OF THE EMBODIMENTS

Figure 1:
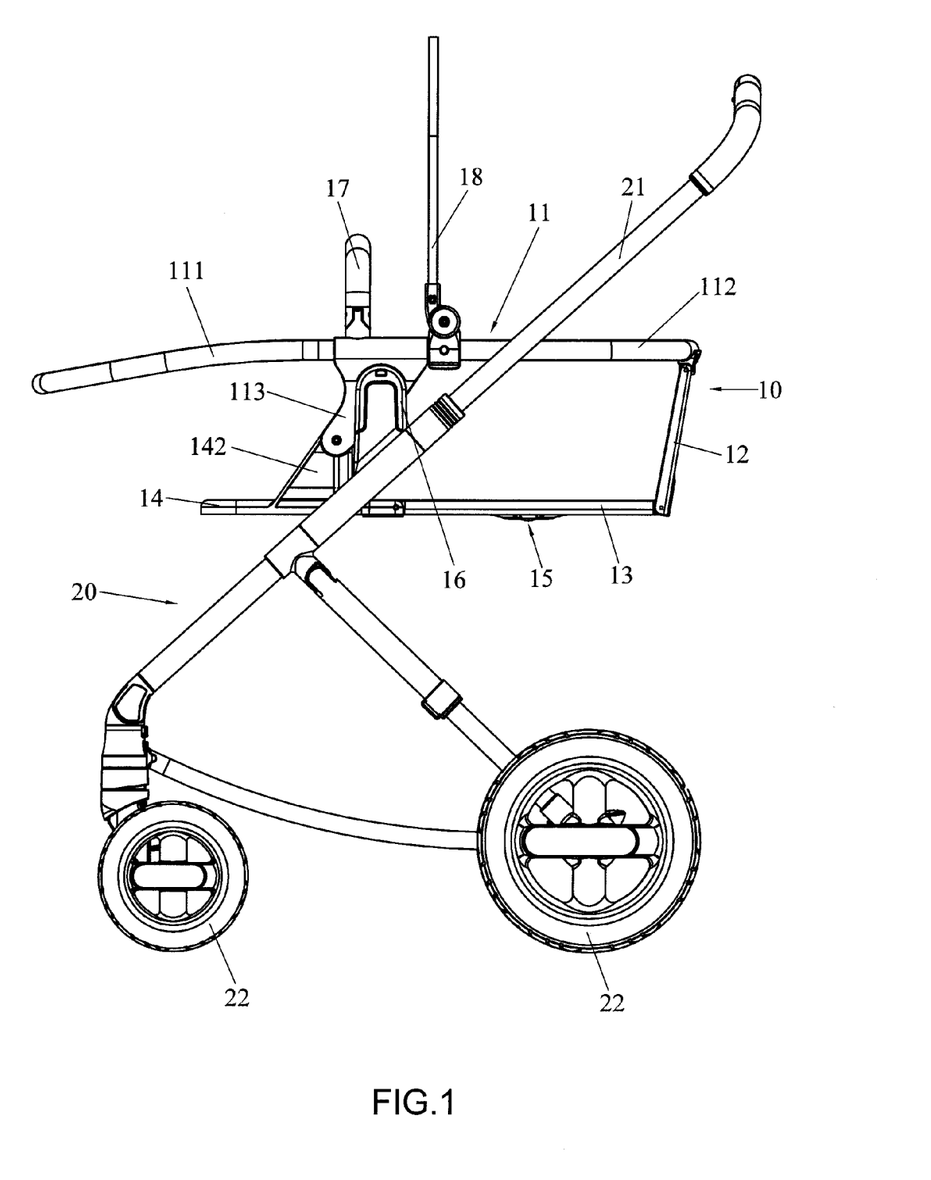
FIG. 1 is a side view illustrating an embodiment of a stroller apparatus installed with a removable infant carrier in a bassinet configuration.
Figure 2:
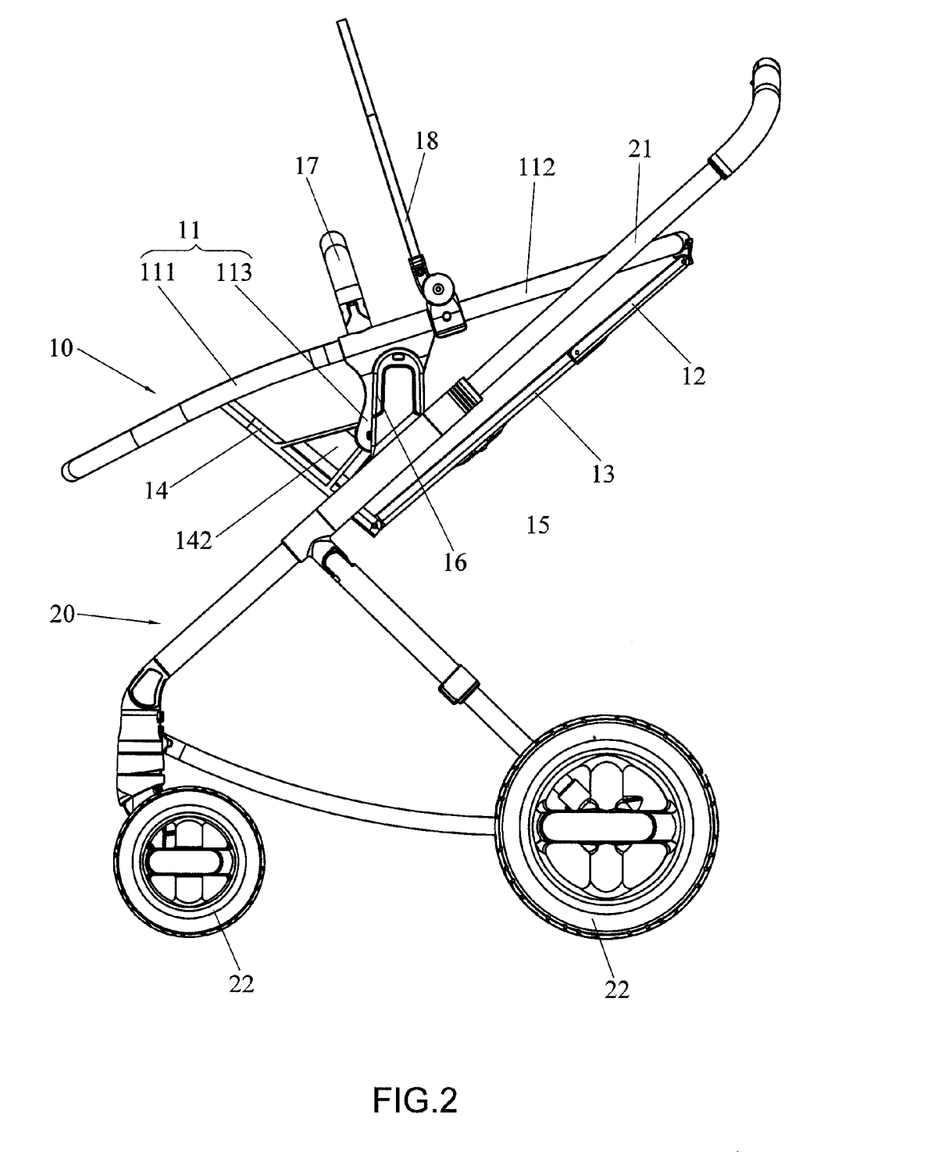
FIG. 2 is a schematic view illustrating the stroller apparatus installed with the infant carrier in a seat configuration.
Figure 3:
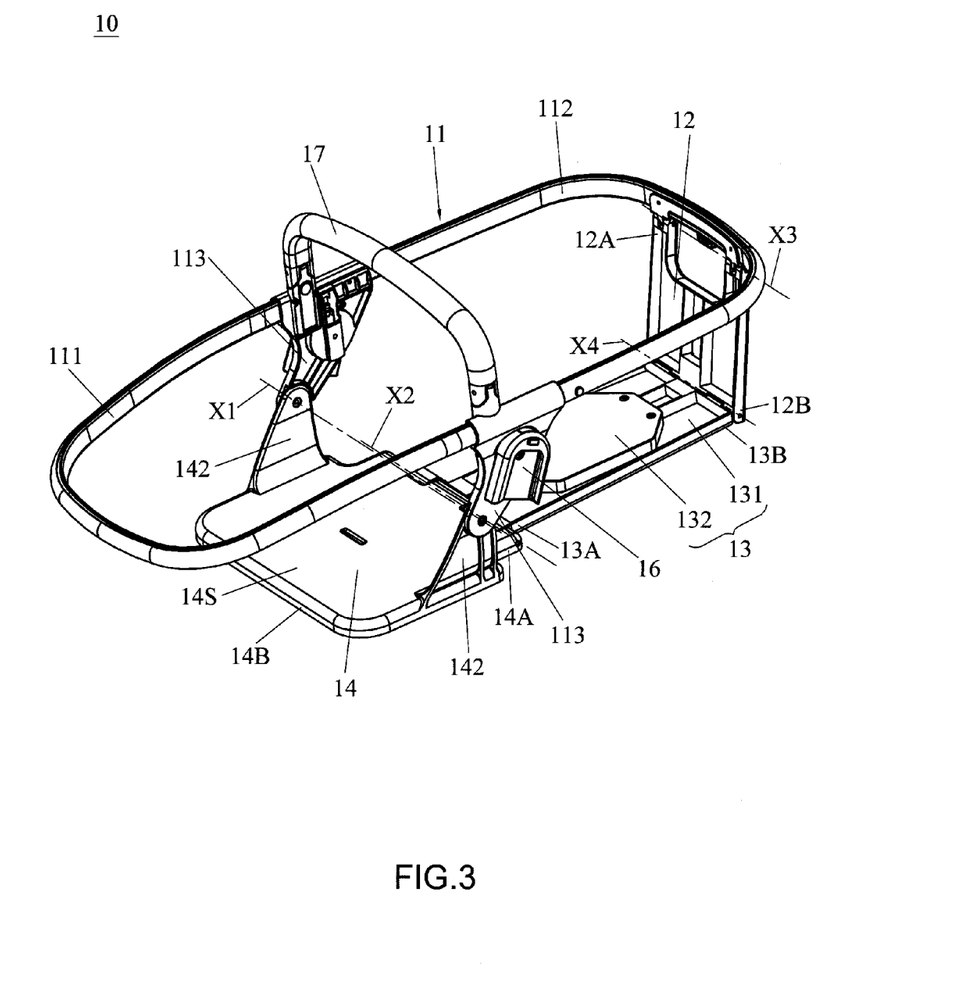
FIG. 3 is a perspective view illustrating the infant carrier alone in the bassinet configuration.
Figure 4:
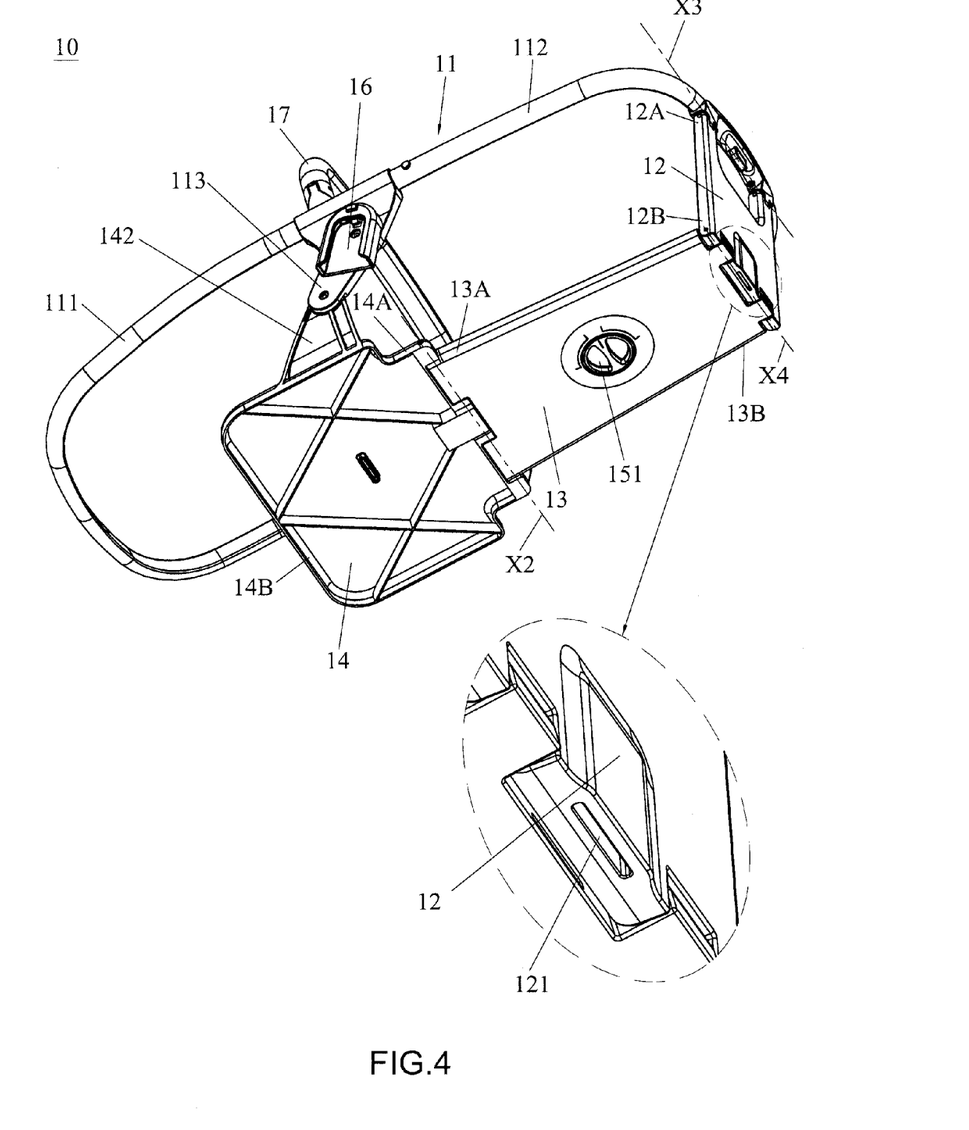
FIG. 4 is another perspective illustrating the infant carrier in the bassinet configuration.

FIGS. 1 and 2 are schematic views illustrating a stroller apparatus 20 assembled with a convertible infant carrier 10. The stroller apparatus 20 can include a stroller frame 21 on which the infant carrier 10 can be detachably assembled. The stroller frame 21 can be formed from the assembly of multiple tubular segments, and can be downwardly provided with wheel assemblies 22. While it is installed on the stroller frame 21, the infant carrier 10 can be converted to a bassinet configuration for receiving a child in a sleeping or horizontal position (as shown in FIG. 1), and a seat configuration for receiving a child in a sitting position (as shown in FIG. 2).

The headrest portion 12 is pivotally connected with the backrest portion 13, and the backrest portion 13 is pivotally connected with the seat portion 14. Moreover, the headrest portion 12 and the seat portion 14 are further pivotally connected with the surrounding frame 11, respectively. The aforementioned pivot connections allow to pivot the different portions for converting the infant carrier 10 to either of the seat configuration and bassinet configuration.

Figure 5:
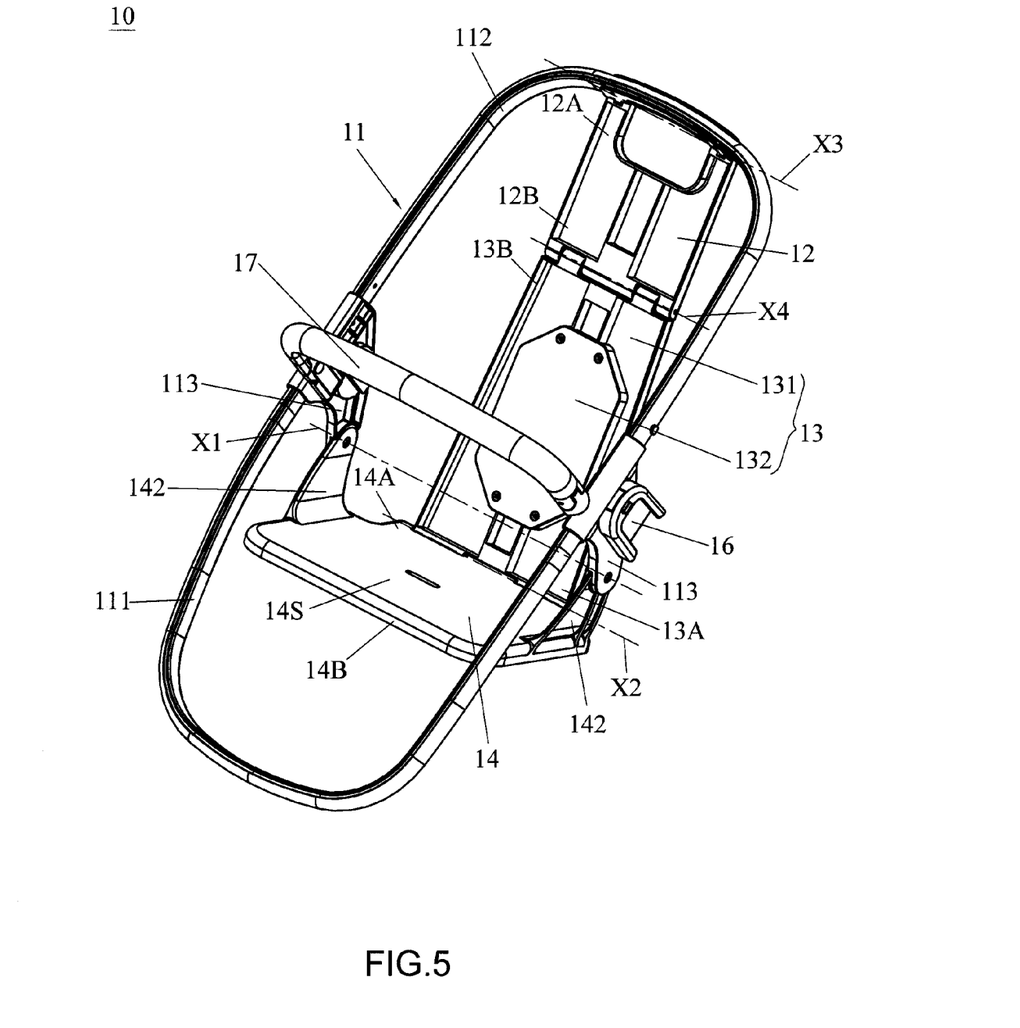
FIG. 5 is a perspective view illustrating the infant carrier alone in the seat configuration.
Figure 6:
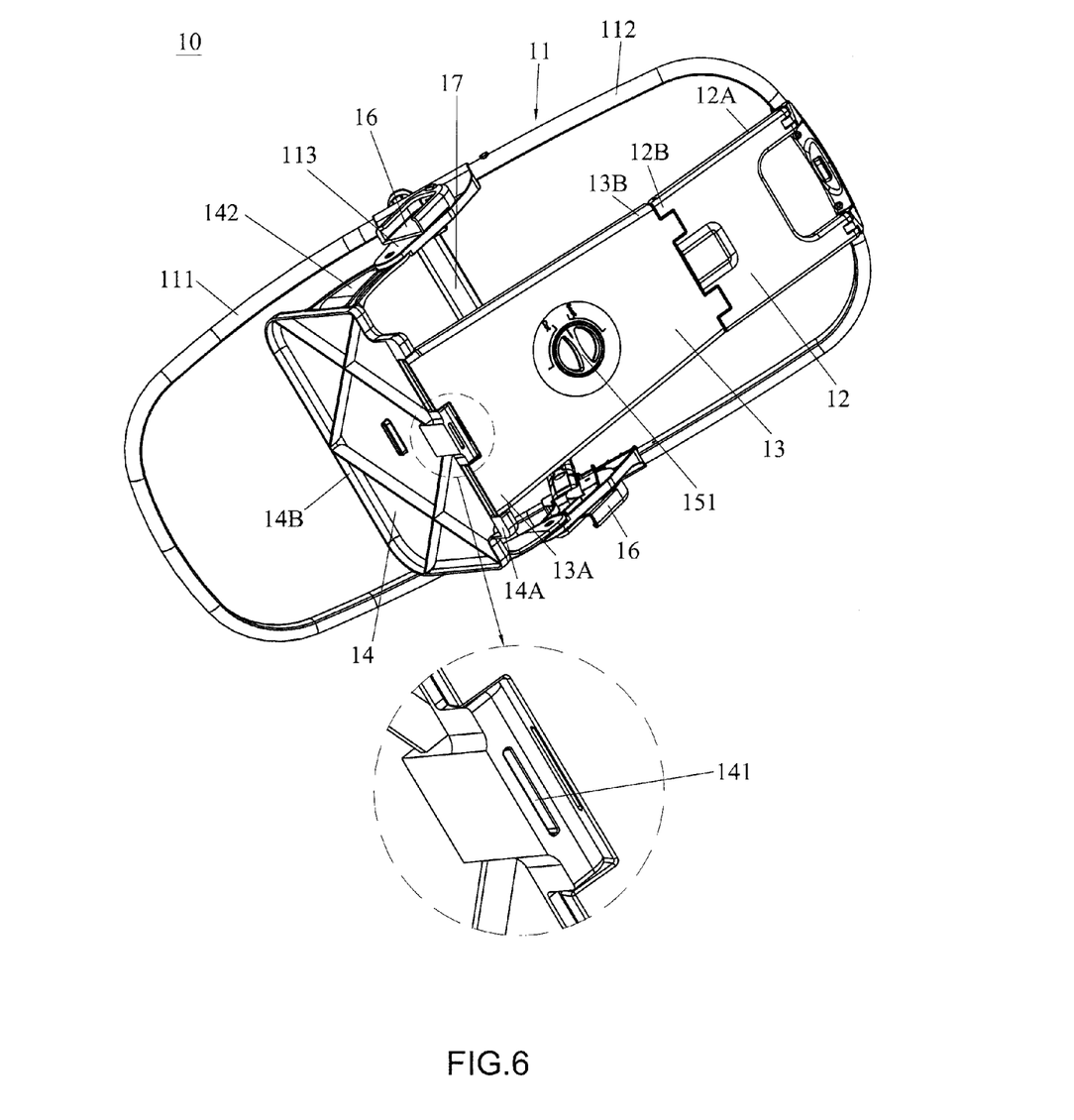
FIG. 6 is another perspective illustrating the infant carrier in the seat configuration.

In conjunction with FIGS. 1 and 2, FIGS. 3 and 4 are schematic views illustrating the infant carrier 10 alone in a bassinet configuration, and FIGS. 5 and 6 are schematic views illustrating the infant carrier 10 alone in a seat configuration. Referring to FIGS. 1-6, the infant carrier 10 can include a surrounding frame 11, a headrest portion 12, a backrest portion 13 and a seat portion 14. The surrounding frame 11 can have a closed shape formed by two frame portions 111 and 112. The two frame portions 111 and 112 can be two U-shaped tubular assemblies that are fixedly connected with each other via two joining structures at a left and a right side of the surrounding frame 11.

The surrounding frame 11 can further include two brackets 113 respectively projecting downward for connection with the seat portion 14. The brackets 113 can be exemplary affixed with the two joining structures connecting the two frame portions 111 and 112 at the left and right sides of the surrounding frame 11.

The seat portion 14 can be provided as a seat board made of a rigid material. The seat portion 14 has a support surface 14S that can provide support for a child placed thereon. A left and a right side of the seat portion 14 can be respectively affixed with brackets 142 projecting upward from the support surface 14S. The two brackets 142 respectively connect pivotally with the two brackets 113, so that the seat portion 14 is pivotally assembled with the surrounding frame 11 about a pivot axis X1 extending transversally relative to the infant carrier 10. The seat portion 14 can further have two opposite end portions 14A and 14B. The end portion 14A of the seat portion 14 is pivotally connected with the backrest portion 13 about a pivot axis X2 extending transversally relative to the infant carrier 10 and parallel to the pivot axis X1, and can have a locking opening 141 (better shown in FIG. 6). The other end portion 14B of the seat portion 14 can be a free end of the support assembly formed by the headrest portion 12, the backrest portion 13 and the seat portion 14.

The headrest portion 12 can be provided as a headrest board made of a rigid material. The headrest portion 12 can have two opposite end portions 12A and 12B. The end portion 12A of the headrest portion 12 is pivotally connected with the surrounding frame 11 (in particular the frame portion 112) about a pivot axis X3 extending transversally relative to the infant carrier 10 and parallel to the pivot axes X1 and X2. The other end portion 12B of the headrest portion 12 is pivotally connected with the backrest portion 13 about a pivot axis X4 extending transversally relative to the infant carrier 10 and parallel to the pivot axes X1-X3, and can have a locking opening 121 formed therein (better shown in FIG. 4).

In one embodiment, the backrest portion 13 can be provided as a backrest board assembly. The backrest portion 13 can have two opposite end portions 13A and 13B. The end portion 13A of the backrest portion 13 is pivotally connected with the end portion 14A of the seat portion 14 about the pivot axis X2, and the other end portion 13B of the backrest portion 13 is pivotally connected with the end portion 12B of the headrest portion 12 about the pivot axis X4.

In the aforementioned assembly, the surrounding frame 11, the headrest portion 12, the backrest portion 13 and the seat portion 14 are pivotally connected with one another in a closed loop. The pivotal connections of these parts allow to desirably convert the infant carrier 10 to a bassinet configuration shown in FIGS. 3 and 4 or a seat configuration shown in FIGS. 5 and 6. In the bassinet configuration, the seat portion 14 and the backrest portion 13 are substantially coplanar to each other and generally parallel to the surrounding frame 11, while the headrest portion 12 rises upward at an angle from the backrest portion 13 to the surrounding frame 11. In this configuration, the locking opening 141 on the end portion 14A of the seat portion 14 is oriented toward the end portion 13A of the backrest portion 13, whereas the position of the headrest portion 12 is such that the locking opening 121 on the end portion 12B of the headrest portion 12 is oriented away from the end portion 13B of the backrest portion 13.

In the seat configuration, the headrest portion 12 and the backrest portion 13 are substantially coplanar to each other, the backrest portion 13 projects from the seat portion 14 at about 90 degrees or greater, and the seat portion 14 is inclined an angle relative to the surrounding frame 11. In this configuration, the locking opening 121 on the end portion 12B of the headrest portion 12 is oriented toward the end portion 13B of the backrest portion 13, whereas the position of the seat portion 14 is such that the locking opening 141 on the end portion 14A of the seat portion 14 is oriented away from the end portion 13A of the backrest portion 13.

Figure 8:
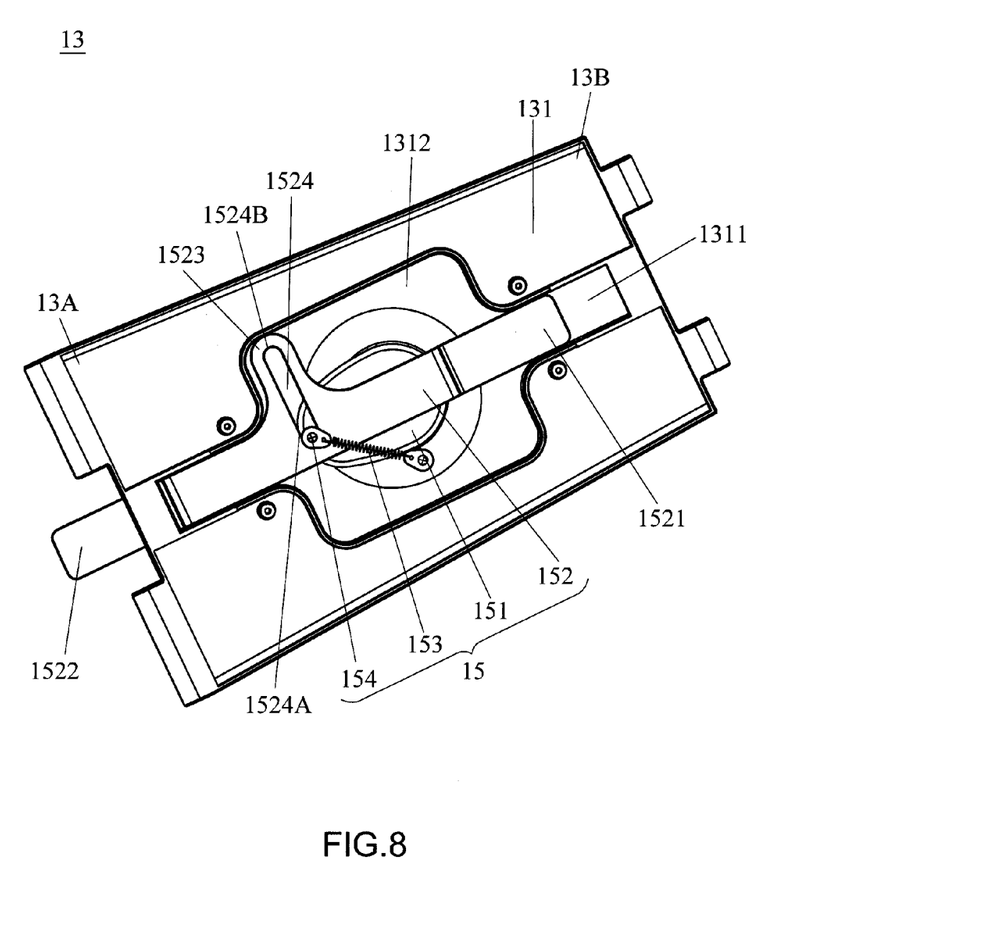
FIG. 8 is a schematic view illustrating the assembly of a latching mechanism with the backrest portion of the infant carrier.
Figure 9:
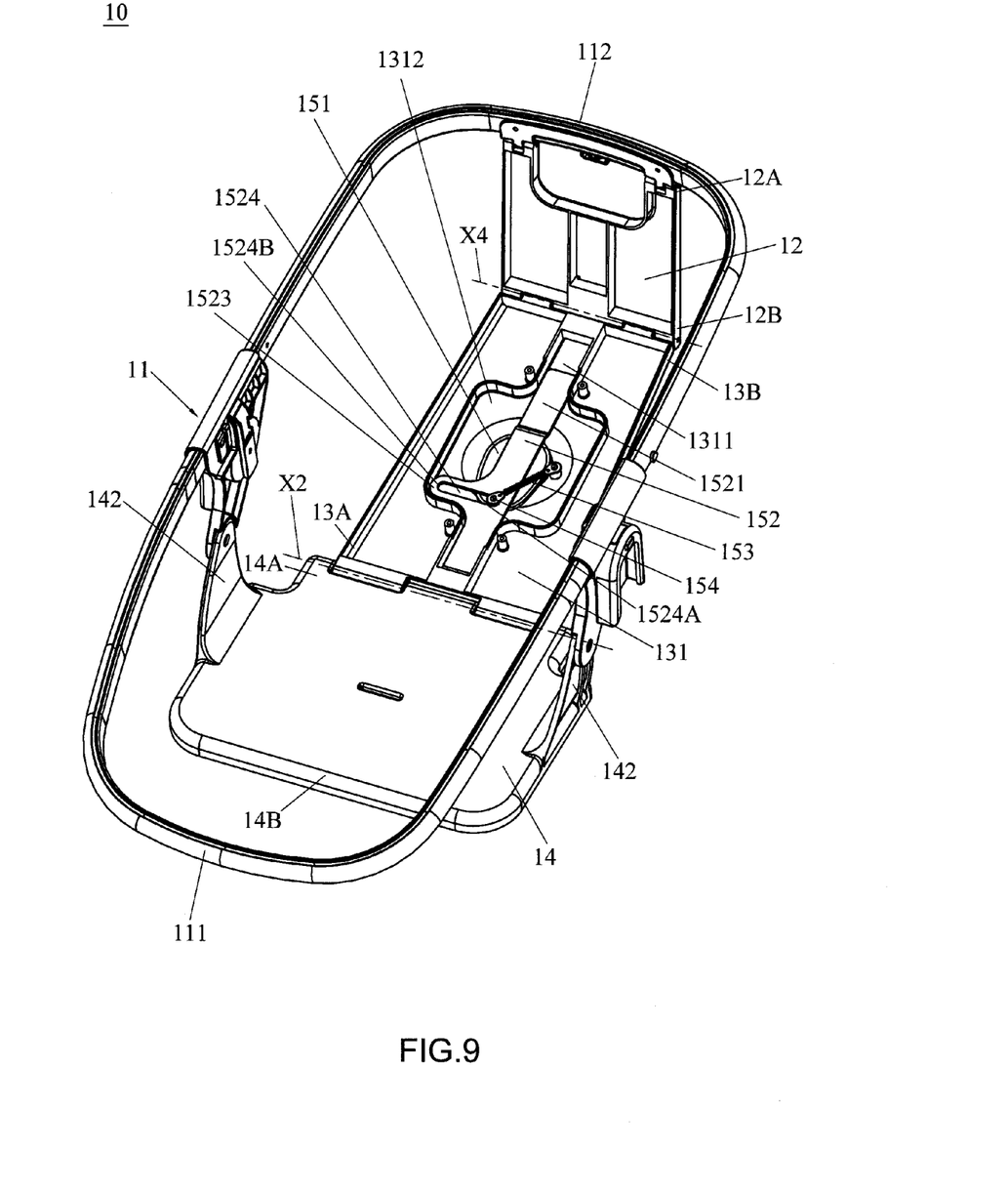
FIG. 9 is a schematic view illustrating the latching mechanism in a first locking state engaged with a seat portion of the infant carrier for locking the infant carrier in the bassinet configuration.

As better shown in FIGS. 8 and 9, the backrest portion 13 can further include a latching mechanism 15 operable to selectively engage with either of the headrest portion 12 and the seat portion 14. When the latching mechanism 15 engages with the headrest portion 12, relative rotation between the headrest portion 12 and the backrest portion 13 about the pivot axis X4 is blocked, and the infant carrier 10 is locked in the seat configuration. When the latching mechanism 15 engages with the seat portion 14, relative rotation between the seat portion 14 and the backrest portion 13 about the pivot axis X2 is blocked, and the infant carrier 10 is locked in the bassinet configuration.

In conjunction with FIGS. 3-6, FIGS. 7 and 8 are schematic views illustrating an embodiment of the latching mechanism 15 provided on the backrest portion 13. In one embodiment, the backrest portion 13 can include a base board 131, and the latching mechanism 15 can include a rotary actuator 151, a latch 152 and a spring 153 that are assembled with the base board 131 of the backrest portion 13.

Figure 7:
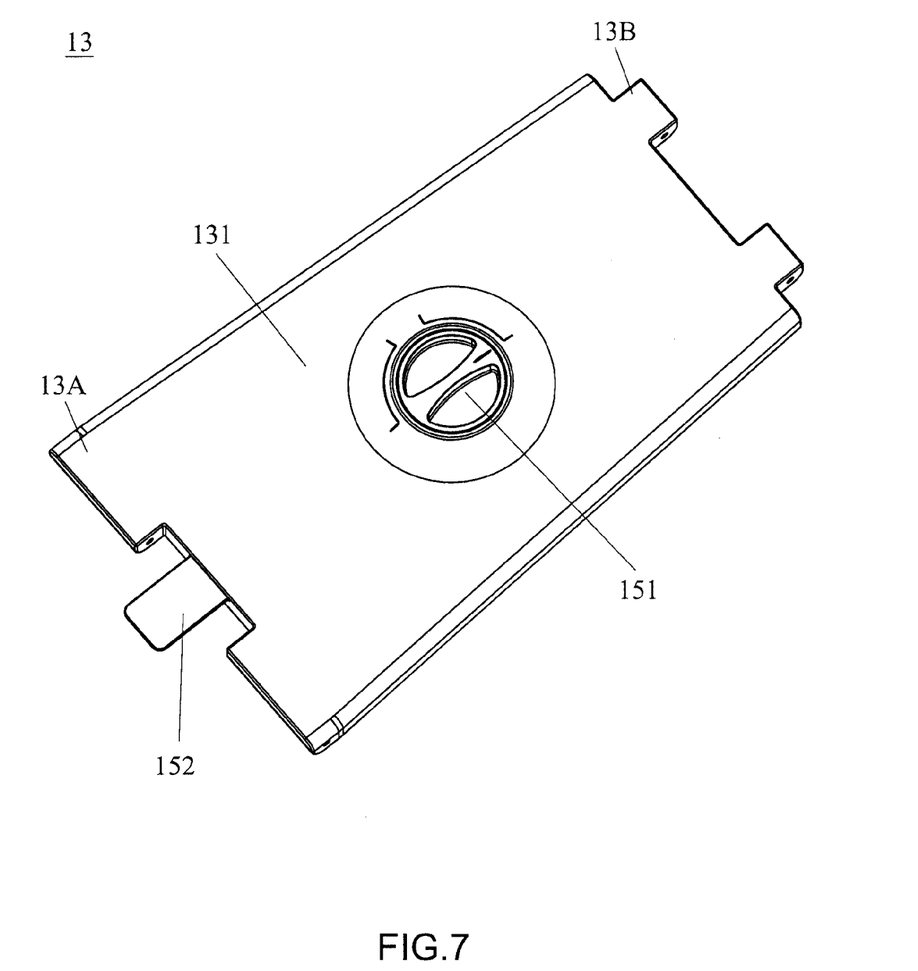
FIG. 7 is a schematic view illustrating a backrest portion of the infant carrier provided with a rotary actuator.

The base board 131 can have a guide slot 1311, and a cavity 1312 connected with the guide slot 1311. The guide slot 1311 extends from the end portion 13A to the other end portion 13B of the backrest portion 13. The cavity 1312 is arranged in a region of the base board 131 between the two opposite end portions 13A and 13B of the backrest portion 13, and is wider than the guide slot 1311 along a transversal direction.

The latch 152 is assembled with the base board 131 for sliding movement along the guide slot 1311 relative to the backrest portion 13. In one embodiment, the latch 152 can be formed as a single integral part, and can have two opposite engaging ends 1521 and 1522 and a linking portion 1523. The two engaging ends 1521 and 1522 can be located at two opposite ends of a substantially linear portion of the latch 152. The linking portion 1523 projects at a side of the latch 152, and is located between the two engaging ends 1521 and 1522. When the latch 152 is assembled with the backrest portion 13, the linking portion 1523 is placed in the cavity 1312, and the two engaging ends 1521 and 1522 are placed in the guide slot 1311. The linking portion 1523 of the latch 152 is restricted to slide within the cavity 1312, and can abut against either of two opposite sidewalls of the cavity 1312. The cavity 1312 thus can delimit the range of sliding displacement of the latch 152 in two opposite directions along a longitudinal axis of the backrest portion 13 extending from the end portion 13A to the other end portion 13B.

When the latch 152 is engaged with the headrest portion 12, the engaging end 1521 of the latch 152 protrudes outward from the end portion 13B of the backrest portion 13 and engages with the locking opening 121 of the headrest portion 12 that is oriented toward the end portion 13B of the backrest portion 13. Moreover, the other engaging end 1522 of the latch 152 retracts inward at the end portion 13A of the backrest portion 13 and is disengaged from the locking opening 141 of the seat portion 14 that is oriented away from the end portion 13A of the backrest portion 13. In this locking state, the latch 152 can block relative rotation between the headrest portion 12 and the backrest portion 13 about the pivot axis X4, and the headrest portion 12 and the backrest portion 13 can be locked substantially coplanar to each other. Owing to the chain connections in closed loop of the surrounding frame 11, the headrest portion 12, the backrest portion 13 and the seat portion 14, this locking state of the latch 152 can prevent relative rotation of all of the seat portion 14, the backrest portion 13 and the headrest portion 12 about the respective pivot axes X1, X2, X3 and X4 to lock the infant carrier 10 in the seat configuration.

When the latch 152 is engaged with the seat portion 14, the engaging end 1522 of the latch 152 protrudes outward from the end portion 13A of the backrest portion 13 and engages with the locking opening 141 of the seat portion 14 that is oriented toward the end portion 13A of the backrest portion 13. Moreover, the other engaging end 1521 of the latch 152 retracts inward at the end portion 13B of the backrest portion 13 and is disengaged from the locking opening 121 of the headrest portion 12 that is oriented away from the end portion 13B of the backrest portion 13. In this locking state, the latch 152 can block relative rotation between the seat portion 14 and the backrest portion 13 about the pivot axis X2, and the seat portion 14 and the backrest portion 13 can be thereby locked substantially coplanar to each other. Owing to the chain connections in closed loop of the surrounding frame 11, the headrest portion 12, the backrest portion 13 and the seat portion 14, this other locking state of the latch 152 can also prevent relative rotation of all of the seat portion 14, the backrest portion 13 and the headrest portion 12 about the respective pivot axes X1, X2, X3 and X4 to lock the infant carrier 10 in the bassinet configuration.

Moreover, the latch 152 has a release position in which the two engaging ends 1521 and 1522 are respectively disengaged from the headrest portion 12 and the seat portion 14 to allow rotation of the headrest portion 12, the backrest portion 13 and the seat portion 14 for adjustment between the bassinet configuration and the seat configuration. The linking portion 1523 can be located at a middle position in the cavity 1312 when the latch 152 is in the release position.

Referring again to FIGS. 7 and 8, the rotary actuator 151 is pivotally connected with the base board 131 of the backrest portion 13, and is accessible for manual operation at the rear of the backrest portion 13. The rotary actuator 151 is connected with the linking portion 1523 of the latch 152, such that rotation of the rotary actuator 151 can drive sliding of the latch 152 in either direction to selectively engage the latch 152 with either of the headrest portion 12 and the seat portion 14, or bring the latch 152 to the release position. In one embodiment, the linking portion 1523 of the latch 152 can include an elongated guide slot 1524 having a proximal end 1524A and a distal end 1524B, and a stud 154 affixed with the rotary actuator 151 at an eccentric location of its pivot axis projects into the cavity 1312 of the base board 131. The stud 154 is disposed through the guide slot 1524, and is guided for sliding displacement along the guide slot 1524. The pivot axis of the rotary actuator 151 can be substantially perpendicular to the base board 131, and the guide slot 1524 can extend substantially perpendicular to the sliding axis of the latch 152. With this assembly, rotation of the rotary actuator 151 can drive the latch 152 to slide in either direction to selectively engage with either of the headrest portion 12 and the seat portion 14. To facilitate the use of the rotary actuator 151, visual markings can also be provided at the rear of the backrest portion 13 to indicate whether the rotary actuator 151 is in the bassinet configuration or seat configuration.

Referring again to FIG. 8, the spring 153 can be a drawing spring. The spring 153 can have two opposite ends respectively anchored with the rotary actuator 151 (e.g., adjacent to the stud 154) and the base board 131 of the backrest portion 13. More specifically, a first end of the spring 153 can be anchored with the stud 154, and a second end of the spring 153 can be connected with the base board 131 at a location that is offset from the pivot axis of the rotary actuator 151 and at a side of the latch 152 opposite to that where projects the linking portion 1523. A cover 132 can be affixed with the base board 131 to enclose at least partially the latch 152 and the spring 153.

Figure 10:
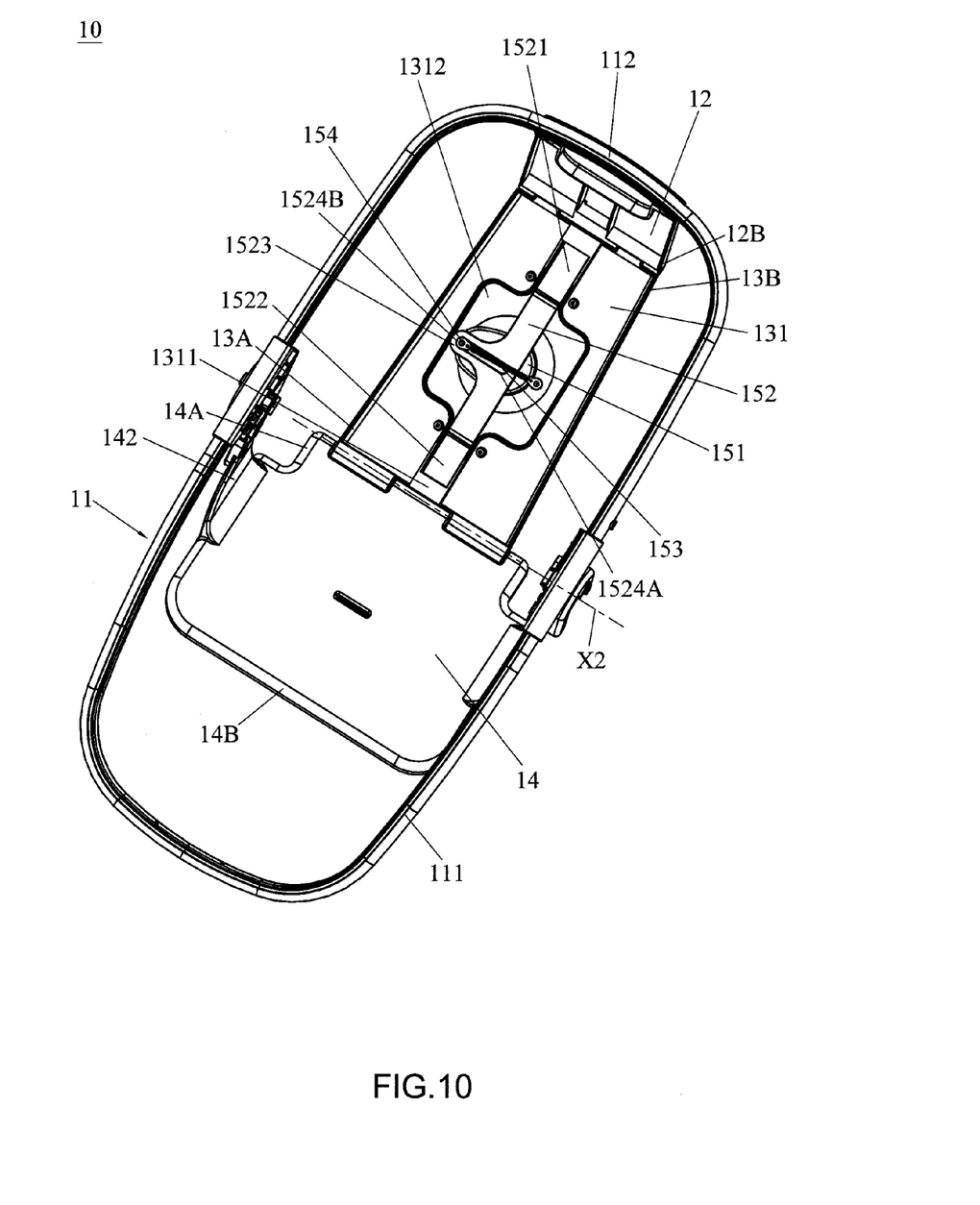
FIG. 10 is a schematic view illustrating the latching mechanism in a release state respectively disengaged from a headrest portion and a seat portion of the infant carrier.

Operation of the spring 153 is described hereinafter with reference to FIGS. 9-11. In FIG. 10, the rotary actuator 151 is shown in a neutral position corresponding to the release position of the latch 152. While the rotary actuator 51 is in the neutral position, the two engaging ends 1521 and 1522 of the latch 152 are respectively disengaged from the headrest portion 12 and the seat portion 14. Moreover, the stud 154 is located closer to the distal end 1524B of the guide slot 1524 (i.e., corresponding to a greatest extension of the spring 153), and the stud 154, the pivot axis of the rotary actuator 151 and the anchoring point of the spring 153 with the base board 131 can be substantially aligned on a same line. As a result, the biasing force applied by the spring 153 can be substantially aligned with a radial direction intersecting the pivot axis of the rotary actuator 151, so that no torque is applied by the spring 153 on the rotary actuator 151 in the neutral position. Accordingly, the rotary actuator 151 and the latch 152 can self-maintain a release state, which can facilitate rotation of the headrest portion 12, the backrest portion 13, and the seat portion 14 relative to one another for adjustment between the bassinet configuration and the seat configuration.

Figure 11:
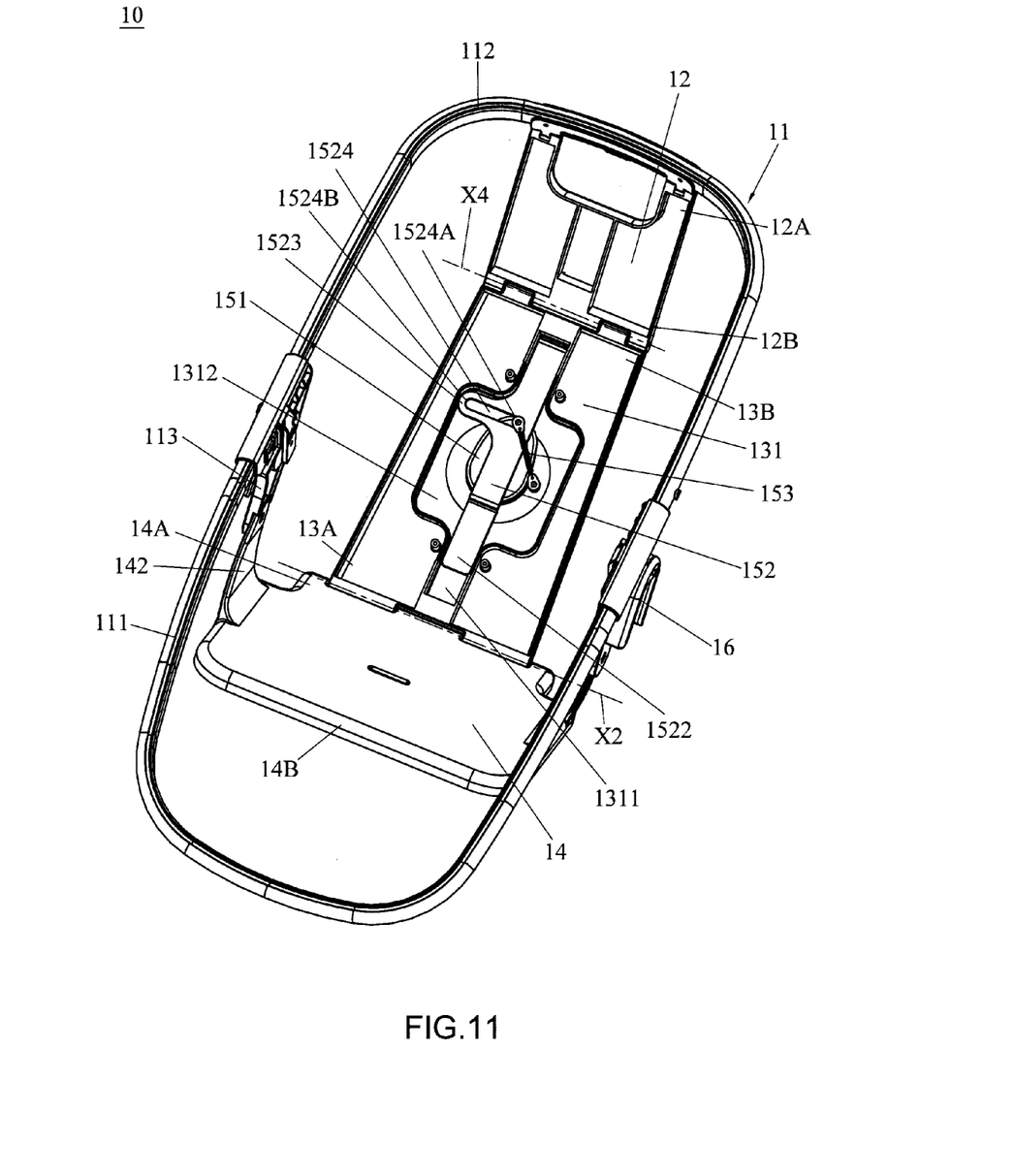
FIG. 11 is a schematic view illustrating the latching mechanism in a second state engaged with a headrest portion of the infant carrier for locking the infant carrier in the seat configuration.

Referring to FIG. 11, when the rotary actuator 151 is rotated away from the neutral position in a direction that displaces the stud 154 toward the end portion 13B of the backrest portion 13, the biasing force applied by the spring 153 can create a torque that rotationally biases the rotary actuator 151 in a first direction to have the latch 152 engaged with the headrest portion 12.

Referring to FIG. 9, when the rotary actuator 151 is rotated away from the neutral position in another direction that displaces the stud 154 toward the end portion 13A of the backrest portion 13, the biasing force applied by the spring 153 can create a torque that rotationally biases the rotary actuator 151 in a second direction to have the latch 152 engaged with the seat portion 14.

Depending on the angular position of the rotary actuator 151, the spring 153 thus can rotationally bias the rotary actuator 151 so as to keep the latch 152 engaged with either of the headrest portion 12 and the seat portion 14.

Referring again to FIGS. 1-6, the two brackets 113 of the surrounding frame 11 can be respectively affixed with connectors 16. The connectors 16 can engage with the stroller frame 21 for locking the infant carrier 10 with the stroller frame 21. In addition, the surrounding frame 11 can be further assembled with a carrying handle 17 and a canopy frame 18. The carrying handle 17 can be exemplary connected with the joining structures that fixedly connect the two frame portions 111 and 112 together. When the infant carrier 10 is removed from the stroller frame 21, the carrying handle 17 can be grasped with one hand to facilitate transport of stroller frame 21. When the infant carrier 10 is installed on the stroller frame 21 in a seat configuration, the carrying handle 17 can be configured as armrests for a child (as shown in FIG. 2).

Exemplary adjustment of the infant carrier 10 between the seat configuration and the bassinet configuration is described hereinafter with reference to FIGS. 1-11. Referring to FIGS. 1 and 9, the infant carrier 10 is shown in the bassinet configuration. In the bassinet configuration, the seat portion 14 and the backrest portion 13 are substantially coplanar and generally parallel to the surrounding frame 11, and the headrest portion 12 rises upright at an angle from the backrest portion 13 to the surrounding frame 11. Moreover, the rotary actuator 151 is in a position offset from the neutral position in which the engaging end 1522 of the latch 152 engages with the locking opening 141 of the seat portion 14 to block relative rotation between the seat portion 14 and the backrest portion 13 about the pivot axis X2, whereas the other engaging end 1521 of the latch 152 remains disengaged from the headrest portion 12. The biasing action applied by the spring 153 on the rotary actuator 151 can maintain the rotary actuator 151 in position for keeping the latch 152 engaged with the seat portion 14, which can lock the infant carrier 10 in the bassinet configuration. As shown in FIG. 9, the stud 154 is located closer to the proximal end 1524A of the guide slot 1524 in the bassinet configuration.

For converting the infant carrier 10 from the bassinet configuration shown in FIGS. 1 and 9 to the seat configuration shown in FIGS. 2, 5 and 11, the rotary actuator 151 can be rotated about 90 degrees to the neutral position shown in FIG. 10, which displaces the stud 154 away from the end portion 13A of the backrest portion 13. As a result, the stud 154 slides along the guide slot 1524 away from its proximal end 1524A toward its distal end 1524B. Once the rotary actuator 151 reaches the neutral position, the latch 152 is respectively disengaged from the headrest 12 and the seat portion 14, which allows relative rotation between the headrest portion 12 and the backrest portion 13 and relative rotation between the seat portion 14 and the backrest portion 13.

While the rotary actuator 151 remains in the neutral position, the seat portion 14, the backrest portion 13 and the headrest portion 12 can be rotated relative to one another about the respective pivot axes X1, X2, X3 and X4 so as to arrange the headrest portion 12 and the backrest portion 13 respectively coplanar to each other, the backrest portion 13 at about 90 degrees with respect to the seat portion 14, and the seat portion 14 inclined an angle relative to the surrounding frame 11. The infant carrier 10 can be thereby converted to the seat configuration shown in FIGS. 2, 5 and 11.

Once the infant carrier 10 is in the seat configuration, the rotary actuator 151 can be rotated away from the neutral position shown in FIG. 10 to an offset position, which displaces the stud 154 toward from the end portion 13B of the backrest portion 13 as shown in FIG. 11. As a result, the stud 154 slides along the guide slot 1524 away from its distal end 1524B toward its proximal end 1524A, which drives the latch 152 to slide for engaging the engaging end 1521 with the locking opening 121 of the headrest portion 12, whereas the engaging end 1522 remains disengaged from the locking opening 141 of the seat portion 14. This locking engagement of the latch 152 with the headrest portion 12 can be maintained by the biasing action applied by the spring 153, which can lock the infant carrier 10 in the seat configuration.

In case the infant carrier 10 is to be adjusted from the seat configuration to the bassinet configuration, the rotary actuator 151 can be rotated about 90 degrees to the neutral position shown in FIG. 10, which displaces the stud 154 away from the end portion 13B of the backrest portion 13. As a result, the stud 154 slides along the guide slot 1524 away from its proximal end 1524A toward its distal end 1524B. Once the rotary actuator 151 reaches the neutral position, the latch 152 is respectively disengaged from the headrest 12 and the seat portion 14. While the rotary actuator 151 remains in the neutral position, the seat portion 14, the backrest portion 13 and the headrest portion 12 can be rotated relative to one another about the respective pivot axes X1, X2, X3 and X4 so as to arrange the seat portion 14 and the backrest portion 13 substantially coplanar and generally parallel to the surrounding frame 11, while the headrest portion 12 rises upright from the backrest portion 13 to the surrounding frame 11. The infant carrier 10 can be thereby converted to the bassinet configuration shown in FIGS. 1 and 9.

Once the infant carrier 10 is in the bassinet configuration, the rotary actuator 151 can be rotated away from the neutral position shown in FIG. 10 to an offset position, which displaces the stud 154 toward from the end portion 13A of the backrest portion 13 as shown in FIG. 9. As a result, the stud 154 slides along the guide slot 1524 away from its distal end 1524B toward its proximal end 1524A, which drives the latch 152 to slide for engaging the engaging end 1522 with the locking opening 141 of the seat portion 14, whereas the engaging end 1521 remains disengaged from the locking opening 121 of the headrest portion 12. This locking engagement of the latch 152 with the seat portion 14 can be maintained by the biasing action applied by the spring 153, which can lock the infant carrier 10 in the bassinet configuration.

Advantages of the structures described herein include the ability to provide an infant carrier that can be installed on a stroller frame, or removed from the stroller frame for independent use. The infant carrier can be desirably converted to any of a bassinet configuration and a seat configuration according to the needs. Moreover, the infant carrier has a latching mechanism assembled with the backrest portion that can be conveniently operated to selectively engage with the headrest portion for locking the infant carrier in the seat configuration, or with the seat portion for locking the infant carrier in the bassinet configuration.

Realization of the infant carrier has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant carrier comprising:
   a surrounding frame;
   a seat portion pivotally connected with the surrounding frame;
   a headrest portion pivotally connected with the surrounding frame;
   a backrest portion pivotally connected with the seat portion and the headrest portion, respectively; and
   a latching mechanism assembled with the backrest portion and operable to selectively engage with either of the seat portion and the headrest portion, the latching mechanism when engaged with the seat portion being disengaged from the headrest portion, and the latching mechanism when engaged with the headrest portion being disengaged from the seat portion, the latching mechanism being configured to lock the infant carrier in either of a bassinet configuration and a seat configuration;

wherein the seat portion and the backrest portion are substantially coplanar and the headrest portion extends at an angle from the backrest portion to the surrounding frame when the infant carrier is in the bassinet configuration, and the headrest portion and the backrest portion are substantially coplanar and the backrest portion extends at an angle from the seat portion when the infant carrier is in the seat configuration.

2. The infant carrier according to claim 1, wherein two opposite sides of the surrounding frame are respectively affixed with two first brackets, and the seat portion has two second brackets that project from a support surface of the seat portion and are respectively connected pivotally with the first brackets.

3. The infant carrier according to claim 1, wherein the latching mechanism engages with the seat portion when the infant carrier is in the bassinet configuration, and the latching mechanism engages with the headrest portion when the infant carrier is in the seat configuration.

4. The infant carrier according to claim 1, wherein the latching mechanism includes a latch slidably assembled with the backrest portion, the latch being movable to selectively engage with either of the headrest portion and the seat portion.

5. The infant carrier according to claim 4, wherein the backrest portion has a first and a second end portion respectively connected pivotally with the headrest portion and the seat portion, and the latch is formed as an integral part slidable along a longitudinal axis of the backrest portion so as to selectively extend outward at either of the first and second end portion to engage with either of the headrest portion and the seat portion.

6. The infant carrier according to claim 4, wherein the latch has a release position where the latch is respectively disengaged from the seat portion and the headrest portion for allowing rotation of the headrest portion, the backrest portion and the seat portion to convert the infant carrier between the bassinet configuration and the seat configuration.

7. The infant carrier according to claim 6, wherein the latch is movable away from the release position to selectively engage with either of the seat portion and the headrest portion, the infant carrier being in the bassinet configuration when the latch is engaged with the seat portion, and the infant carrier being in the seat portion when the latch is engaged with the headrest portion.

8. The infant carrier according to claim 4, wherein the headrest portion has a first locking opening and the seat portion has a second locking opening, and the latch is movable to selectively engage with either of the first and second locking openings.

9. The infant carrier according to claim 4, wherein the latching mechanism further includes a rotary actuator pivotally connected with the backrest portion, the rotary actuator being rotatable to drive the latch in sliding movement.

10. The infant carrier according to claim 9, wherein the rotary actuator is accessible for operation at a rear of the backrest portion.

11. The infant carrier according to claim 9, wherein the latch includes a guide slot that extends substantially perpendicular to a sliding axis of the latch, and the rotary actuator is affixed with a stud guided for movement along the guide slot.

12. The infant carrier according to claim 11, wherein the latch has two opposite engaging ends respectively engageable with the headrest portion and the seat portion, and the guide slot is formed in a linking portion of the latch that is located between the two engaging ends.

13. The infant carrier according to claim 12, wherein the backrest portion includes a cavity in which the linking portion is restricted to slide.

14. The infant carrier according to claim 13, wherein the linking portion is located at a middle position of the cavity when the latch is in a release position, the latch when in the release position is respectively disengaged from the seat portion and the headrest portion for allowing rotation of the headrest portion, the backrest portion and the seat portion to convert the infant carrier between the bassinet configuration and the seat configuration.

15. The infant carrier according to claim 9, wherein the latching mechanism further includes a spring having two opposite ends respectively anchored with the rotary actuator and the backrest portion, the spring being configured to bias the rotary actuator for keeping the latch engaged with either of the headrest portion and the seat portion.

16. The infant carrier according to claim 15, wherein one of the two ends of the spring is anchored with the backrest portion at a location that is offset from a pivot axis of the rotary actuator.

17. The infant carrier according to claim 15, wherein the rotary actuator has a neutral position in which the latch is respectively disengaged from the seat portion and the headrest portion for adjustment of the infant carrier between the bassinet configuration and the seat configuration, a biasing force applied by the spring being substantially aligned with a radial direction intersecting a pivot axis of the rotary actuator when the rotary actuator is in the neutral position.

18. The infant carrier according to claim 17, wherein the biasing force applied by the spring rotationally biases the rotary actuator for keeping the latch engaged with either of the headrest portion and the seat portion when the rotary actuator is displaced away from the neutral position.

19. A stroller apparatus, including a stroller frame, and the infant carrier according to claim 1 installed on the stroller frame.

20. An infant carrier comprising:
a surrounding frame;
a seat portion pivotally connected with the surrounding frame;
a headrest portion pivotally connected with the surrounding frame;
a backrest portion having a first and a second end portion respectively connected pivotally with the seat portion and the headrest portion; and
a latch assembled with the backrest portion, the latch being slidable between a first position where the latch is positioned adjacent to the first end portion and engages with the seat portion, and a second position where the latch is positioned adjacent to the second end portion and engages with the headrest portion, the latch being configured to lock the infant carrier in either of a bassinet configuration and a seat configuration;

wherein the seat portion and the backrest portion are arranged so as to receive a child in a generally horizontal position in the bassinet configuration, and the seat portion and the backrest portion are arranged so as to receive a child in a sitting position in the seat configuration.

21. The infant carrier according to claim 20, wherein the latch is formed as an integral part having two opposite engaging ends respectively engageable with the seat portion and the headrest portion.

22. The infant carrier according to claim 20, wherein the latch has a release position where the latch is respectively disengaged from the seat portion and the headrest portion.

23. The infant carrier according to claim 20, further including a rotary actuator pivotally assembled with the backrest portion and connected with the latch, the rotary actuator being operable from a rear of the backrest for driving the latch to slide between the first and second positions.

24. The infant carrier according to claim 23, further including a spring respectively connected with the backrest portion and the rotary actuator, the spring being configured to bias the rotary actuator for keeping the latch engaged with either of the seat portion and the headrest portion.

25. The infant carrier according to claim 24, wherein the rotary actuator has a neutral position in which the latch is respectively disengaged from the seat portion and the headrest portion, a biasing force applied by the spring being substantially aligned with a radial direction intersecting a pivot axis of the rotary actuator when the rotary actuator is in the neutral position.

26. The infant carrier according to claim 20, wherein the seat portion and the backrest portion are substantially coplanar in the bassinet configuration, and the headrest portion and the backrest portion are substantially coplanar in the seat configuration.

27. A stroller apparatus, including a stroller frame, and the infant carrier according to claim 20 installed on the stroller frame.

* * * * *